United States Patent
Shih et al.

(10) Patent No.: US 9,742,317 B2
(45) Date of Patent: Aug. 22, 2017

(54) REGENERATIVE BRAKING CONTROLLING SYSTEM AND METHOD

(71) Applicant: HON HAI PRECISION INDUSTRY CO., LTD., New Taipei (TW)

(72) Inventors: Ying-Che Shih, New Taipei (TW); Hsien-Hsi Juan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/752,024

(22) Filed: Jun. 26, 2015

(65) Prior Publication Data
US 2016/0190959 A1 Jun. 30, 2016

(30) Foreign Application Priority Data
Dec. 31, 2014 (TW) .............................. 103146692 A

(51) Int. Cl.
*H02P 3/14* (2006.01)
*B60L 7/00* (2006.01)
*H02P 3/18* (2006.01)
*H02P 21/36* (2016.01)

(52) U.S. Cl.
CPC .................. *H02P 3/14* (2013.01); *B60L 7/00* (2013.01); *H02P 3/18* (2013.01); *H02P 21/36* (2016.02)

(58) Field of Classification Search
CPC .................................. H02P 3/14; H02P 21/36
USPC ............................................. 318/376, 86, 87
See application file for complete search history.

(56) References Cited

U.S. PATENT DOCUMENTS

| | | | | |
|---|---|---|---|---|
| 6,690,137 B2* | 2/2004 | Iwaji | ....................... | H02P 23/30 318/430 |
| 2010/0072926 A1* | 3/2010 | Itoh | ....................... | B60L 11/123 318/400.09 |
| 2010/0134056 A1* | 6/2010 | Yamamoto | ........... | H02P 21/0021 318/400.15 |

(Continued)

OTHER PUBLICATIONS

D. W. Novotny, T.A. Llpo, Vector control and dynamics of ac drives, 1996, Oxford Science Publications, pp. 70-73.*

(Continued)

*Primary Examiner* — Bickey Dhakal
(74) *Attorney, Agent, or Firm* — Steven Reiss

(57) ABSTRACT

The regenerative braking controlling system includes an armature current sampling module, a calculating module, and an adjusting module. The calculating module includes a power calculating unit, an optimum phase angle calculating unit, an optimum regenerative current calculating unit, and a sub-optimum regenerative current calculating unit. The armature current sampling module samples current of the three phase armature windings. The power calculating unit determines a relationship between a regenerative power and a phase angle of the armature currents. The optimum phase angle calculating unit calculates an optimum phase angle, and obtain a phase regenerative path based on the optimum phase angle. The optimum regenerative current calculating unit calculates an optimum regenerative current limit point. The sub-optimum regenerative current calculating unit calculates a sub-optimum regenerative current limit point. The adjusting module adjusts regenerative current according to the optimum regenerative current limit point and the sub-optimum regenerative current limit point.

10 Claims, 5 Drawing Sheets

(56) References Cited

U.S. PATENT DOCUMENTS

2014/0312812 A1* 10/2014 Sasaki ................ H02P 21/0003
　　　　　　　　　　　　　　　　　　　318/400.02

OTHER PUBLICATIONS

Dr. Nikola Milivojevic "ECEN 5737: Adjustable Speed Drives Lecture-22", Spring 2013, University of Colorado, Boulder, pp. 1-16.*

* cited by examiner

REGENERATIVE BRAKING CONTROLLING SYSTEM AND METHOD

FIELD

The subject matter herein generally relates to regenerative braking controlling systems and methods, and particularly to a regenerative braking controlling system and method for an electric vehicle.

BACKGROUND

Nowadays, motors of electric vehicles commonly both have a driving function and a regenerative braking function. The regenerative braking function is that an accelerator of an vehicle is released or the vehicle is braked, the vehicle drives the motor because of inertia and kinetic energy of the vehicle is converted into regenerative energy for a battery of the vehicle by switching drivers of the motor. In a typical regenerative braking controlling method based on an magnetic field oriented control, when regenerative current is beyond a preset current value, mechanical energy generated from the braking is consumed by resistors of motor so that regenerative braking efficiency is relative lower.

BRIEF DESCRIPTION OF THE DRAWINGS

Implementations of the present technology will now be described, by way of example only, with reference to the attached figures, wherein.

DETAILED DESCRIPTION

Figure 1:
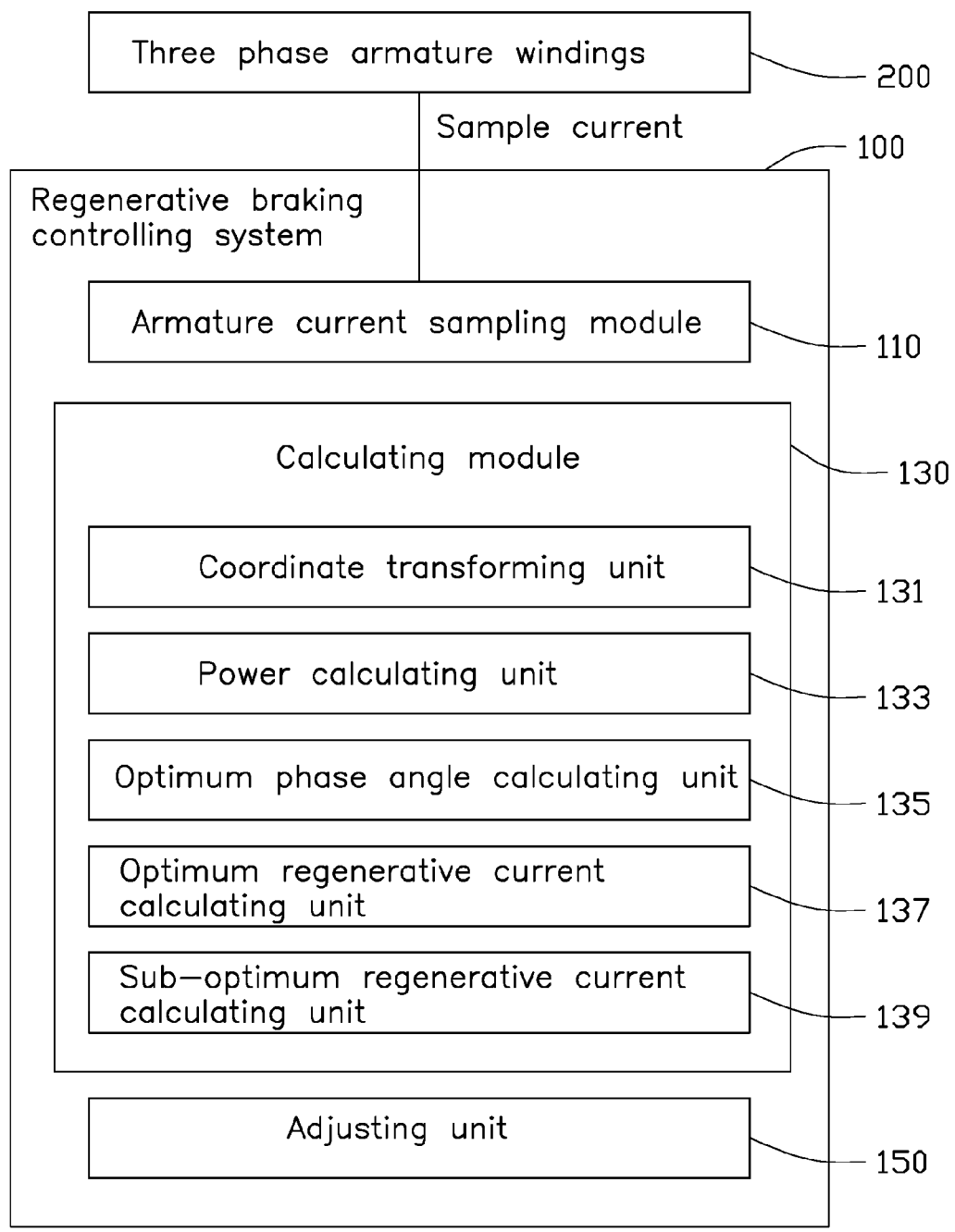
FIG. 1 is a block diagram of one embodiment of a regenerative braking controlling system for an electric vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates a block diagram of one embodiment of a regenerative braking controlling system 100 for an electric vehicle. The regenerative braking controlling system 100 is based on a magnetic field oriented control, realizes a maximum torque control of current per unit and increases regenerative efficiency of a motor of the electric vehicle by adjusting a regenerative charging current phase angle of the electric vehicle. In at least one embodiment, the motor is a built-in magnet type permanent magnet brushless motor, including a stator and a rotor. The stator is three-phase armature windings and includes in an A phase winding, a B phase winding, and a C phase winding which have a difference of about 120 degrees between each other in spatial location. The rotor includes a built-in permanent magnet, and can rotate relative to the three phase armature windings 200.

The regenerative braking controlling system 100 includes an armature current sampling module 110, a calculating module 130, and an adjusting module 150. The calculating module 130 includes a coordinate transforming unit 131, a power calculating unit 133, an optimum phase angle calculating unit 135, an optimum regenerative current calculating unit 137, and a sub-optimum regenerative current calculating unit 139.

Figure 2:
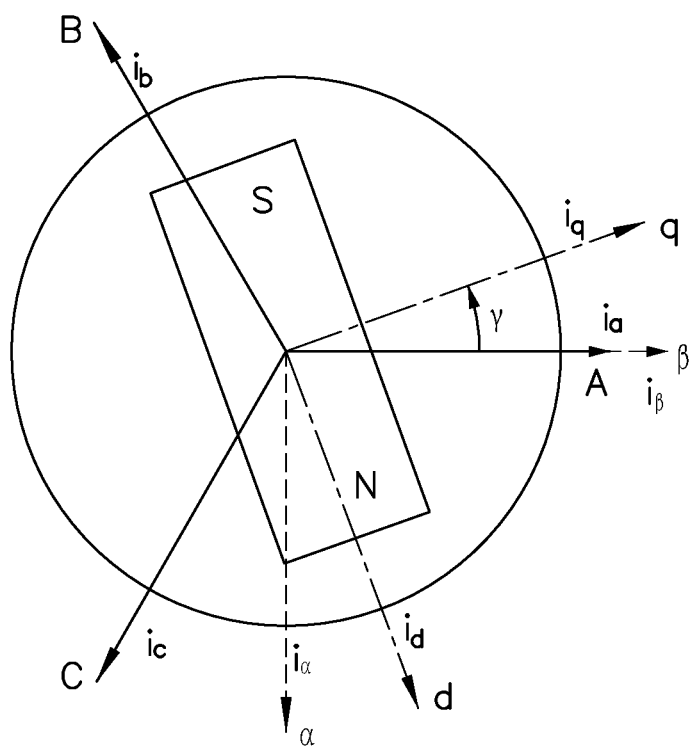
FIG. 2 is a diagrammatic view of a coordinate system of the regenerative braking controlling system of FIG. 1.
Figure 3:
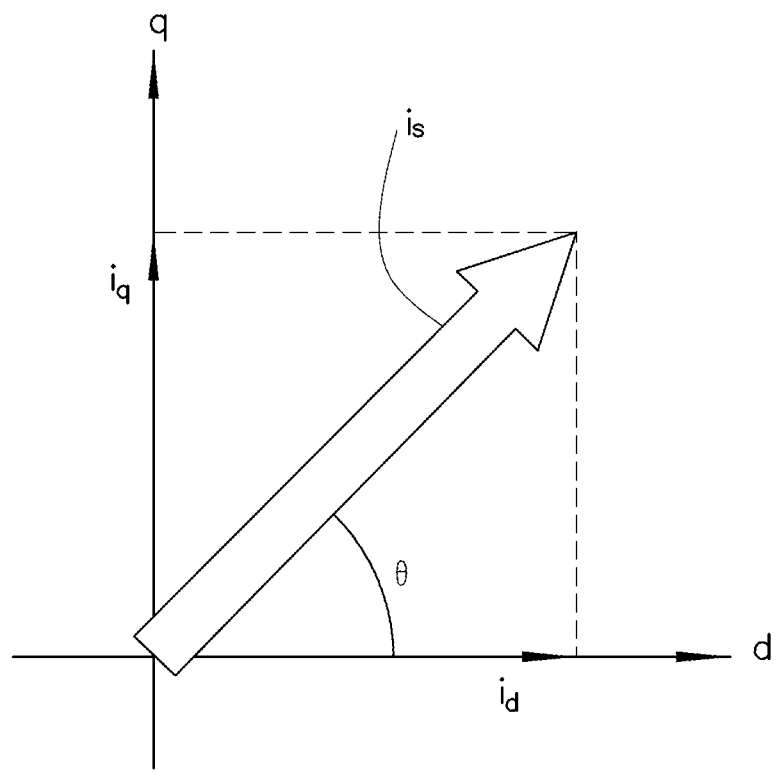
FIG. 3 is a diagrammatic view of a relationship between of armature current and d-axis and q-axis current of a motor of the regenerative braking controlling system of FIG. 1.

The armature current sampling module 110 is configured to sample current $i_a$, $i_b$, $i_c$ of the three phase armature windings 200, respectively. Referring to FIG. 2 and FIG. 3, the coordinate transforming unit 131 is configured to transform the current $i_a$, $i_b$, $i_c$ of the three phase armature windings 200 represented (i.e. characterized, or reflected) in a preset three axis and two-dimensional A-B-C coordinate system into two fixed axis current $i_\alpha$, $i_\beta$ represented in a fixed axis $\alpha$-$\beta$ coordinate system, according to a preset first coordinate transforming rules, and then transform the two fixed axis current $i_\alpha$, $i_\beta$ into two rotating axis current $i_d$, $i_q$ represented in a rotating axis d-q coordinate system, according to a preset second coordinate transforming rules.

In at least one embodiment, the first coordinate transforming rules is Clarke transformation, and the second coordinate transforming rules is Park transformation.

The power calculating unit 133 is configured to calculate to regenerative power $P_g$ based on the rotating axis current $i_d$, $i_q$ and determines a relationship between the regenerative power $P_g$ and a phase angle $\theta$ of the armature current according to a relationship between the rotating axis current and the phase angle $\theta$ of the armature current. The optimum phase angle calculating unit 135 is configured to calculate an optimum phase angle under a same armature current $i_s$, and obtains a phase regenerative path based on the optimum phase angle. The optimum regenerative current calculating unit 137 is configured to calculate an optimum regenerative current limit point under a same armature voltage. The sub-optimum regenerative current calculating unit 139 is configured to calculate a sub-optimum regenerative current limit point under a same armature voltage. The adjusting module 150 is configured to adjust the regenerative current of the motor according to the optimum regenerative current limit point and the sub-optimum regenerative current limit point.

In the $\alpha$-$\beta$ coordinate system shown in FIG. 2, $\gamma$ represents an angle of the rotor, S and N represent south pole and north pole of the magnet of the rotor. The power calculating unit 133 calculates the regenerative power $P_g$ based on the two fixed axis current $i_\alpha$, $i_\beta$ according to the following equation (1):

$$P_g = V_{dc}I_{dc} = \frac{3}{2}r(i_d + i_q)^2 + T\omega =$$ equation (1)

$$\frac{3}{2}r(i_d + i_q)^2 + \frac{3}{2}\frac{P}{2}\omega[\lambda_m i_q + (L_d - L_q)i_d i_q].$$

Wherein, $V_{dc}$ and $I_{dc}$ represent voltage and current of a DC current end of the armature of the motor, r represents armature resistance of the motor, T represents electromagnetic torque of the motor, $L_d$, $L_q$ represents inductances of the armature of the motor corresponding to rotating axis (i.e. d-axis and q-axis), ω represents rotational angular velocity of the armature of the rotor, $\lambda_m$ represents magnetic flux of the magnet of the rotor, P represents a number of poles of the armature of the motor.

FIG. 3 illustrates a schematic view of a relationship between the armature current $i_s$ and the two rotating axis current $i_d$, $i_q$. The relationship between the armature current $i_s$ and the two rotating axis current $i_d$, $i_q$ satisfies the following equation (2):

$$\begin{cases} i_d = i_s \cos\theta \\ i_q = i_s \sin\theta \end{cases}$$ equation (2)

Wherein, θ represents the phase angle of the armature current. The power calculating unit 133 obtains the relationship between the regenerative power $P_g$ and the phase angle θ of the armature current as the following equation (3) by plugging the equation (1) into the equation (2):

$$P_g = V_{dc}I_{dc} = \frac{3}{2}ri_s^2 + \frac{3}{2}\frac{P}{2}\omega\left[\lambda_m i_s \sin\theta + \frac{1}{2}(L_d - L_q)i_s^2 \sin 2\theta\right].$$ equation (3)

The equation (3) is a regenerative power equation of the motor. $V_{dc}I_{dc}$ is the regenerative power $P_g$ of the motor. In at least one embodiment, during the regenerative braking process, the current $I_{dc}$ of the DC current end of the armature of the motor and the electromagnetic torque T are both negative.

The optimum phase angle calculating unit 135 obtains the optimum phase angle by doing a partial differential to the regenerative power $P_g$ relative to the phase angle θ, and making a second partial differential be greater than zero, according to the following equation (4):

$$\frac{\partial P_g}{\partial \theta} = 0, \frac{\partial^2 P_g}{\partial \theta^2} > 0 \rightarrow \cos\theta = \frac{-\lambda_m - \sqrt{\lambda_m^2 + 8(L_d - L_q)^2 i_s^2}}{4i_s(L_d - L_q)}.$$ equation (4)

The optimum regenerative current calculating unit 137 obtains the optimum regenerative current limit point $I_1$ under the same armature voltage by doing a partial differential to the regenerative power $P_g$ relative to the armature current $i_s$ and making the partial differential be equal to zero, according to the following equation (5):

$$\frac{\partial P_g}{\partial i_s} = 0 \rightarrow I_1 = \frac{-P\omega\lambda_m \sin\theta}{4r + P\omega(L_d - L_q)\sin 2\theta}.$$ equation (5)

Because when the armature current $i_s$ is greater than the sub-optimum regenerative current limit point, mechanical energy generated by braking is converted to consumption of resister power and there is no regenerative current. With the armature current $i_s$ beyond the sub-optimum regenerative current limit point, the DC current end of the armature starts to output current to provide mechanical energy for braking that is entering into an energy consuming regenerative mode. Therefore, the sub-optimum regenerative current limit point is a cut-off point which divides the DC current end of the armature from a regenerative state to an output state. The sub-optimum regenerative current calculating unit 139 obtains the sub-optimum regenerative current limit point under the same armature voltage, according the following equation (6) by plugging $P_g$=0 into equation (3).

$$P_g = 0 \rightarrow I_2 = \frac{-2P\omega\lambda_m \sin\theta}{4r + P\omega(L_d - L_q)\sin 2\theta}.$$ equation (6)

Figure 4:
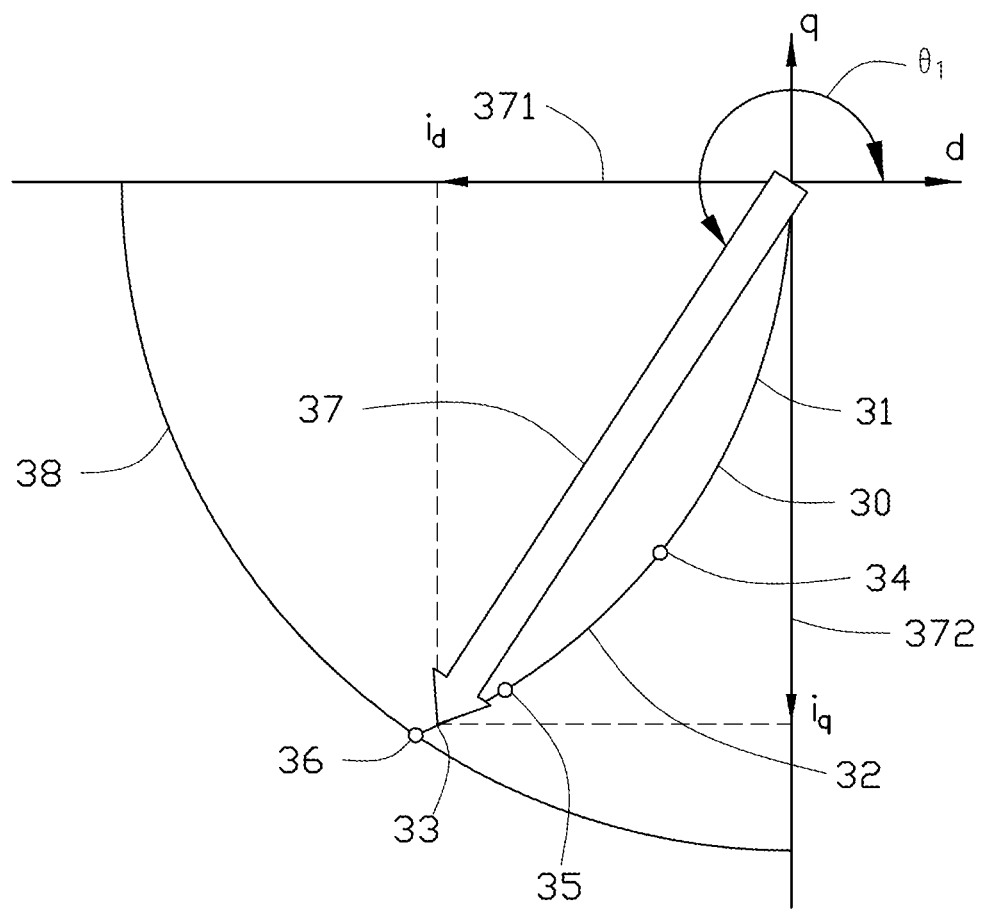
FIG. 4 is an vector diagram of regenerative current of the regenerative braking controlling system of FIG. 1.

FIG. 4 illustrates a vector diagram of regenerative current of the regenerative braking control system 100 of FIG. 1. Wherein, the regenerative current 37 can be decomposed into a first vector component 371 along the direction of the d-axis and a second vector component 372 along the direction of the q-axis. The first vector component 371 is the d-axis current $i_d$. The second vector component 372 is the q-axis current $i_q$. The optimum phase angle $\theta_1$ can be calculated by plugging the armature current $i_s$=0~$i_{max}$ ($i_{max}$ is defined as a maximum armature current limit) into equation (4), and then the d-axis current and the q-axis current can be calculated by equation (2). The phase regenerative path 30 can be obtained by drawing vector paths formed by the d-axis current and the q-axis current. The phase regenerative path 30 and a maximum armature current limit circle 38 intersect at a node 36. Wherein, the maximum armature current limit circle 38 is defined as a circle having the original point of the rotating d-q coordinate system as a center and having $i_s$=$i_{max}$ as a radius. First limit current 34 can be calculated by equation (5). The first limit current 34 is positioned at the phase regenerative path 30. Second limit current 35 can be calculated by equation (6). The first limit current 34 is also positioned at the phase regenerative path 30. A distance between the second limit current 35 and the original point of the rotating d-q coordinate system is larger than that of the first second limit current 35. The first limit current 34 and the second limit current 35 divide the phase regenerative path 30 into an optimum regenerative path 31, a sub-optimum regenerative path 32, and an energy consuming path 33. Wherein, the optimum regenerative path 31 is positioned between the original point of the rotating d-q coordinate system and the first limit current 34. The sub-optimum regenerative path 32 is positioned between the first limit current 34 and the second limit current 35. The energy consuming path 33 is positioned between the second limit current 35 and the node 36.

Therefore, if the regenerative current is limited along the optimum regenerative path 31, the electric vehicle is in an optimum regenerative mode. If the regenerative current is limited along the sub-optimum regenerative path 32, the electric vehicle is in a sub-optimum regenerative mode. If the regenerative current is limited along the energy consuming path 33, the electric vehicle is in an energy consuming regenerative mode.

Figure 5:
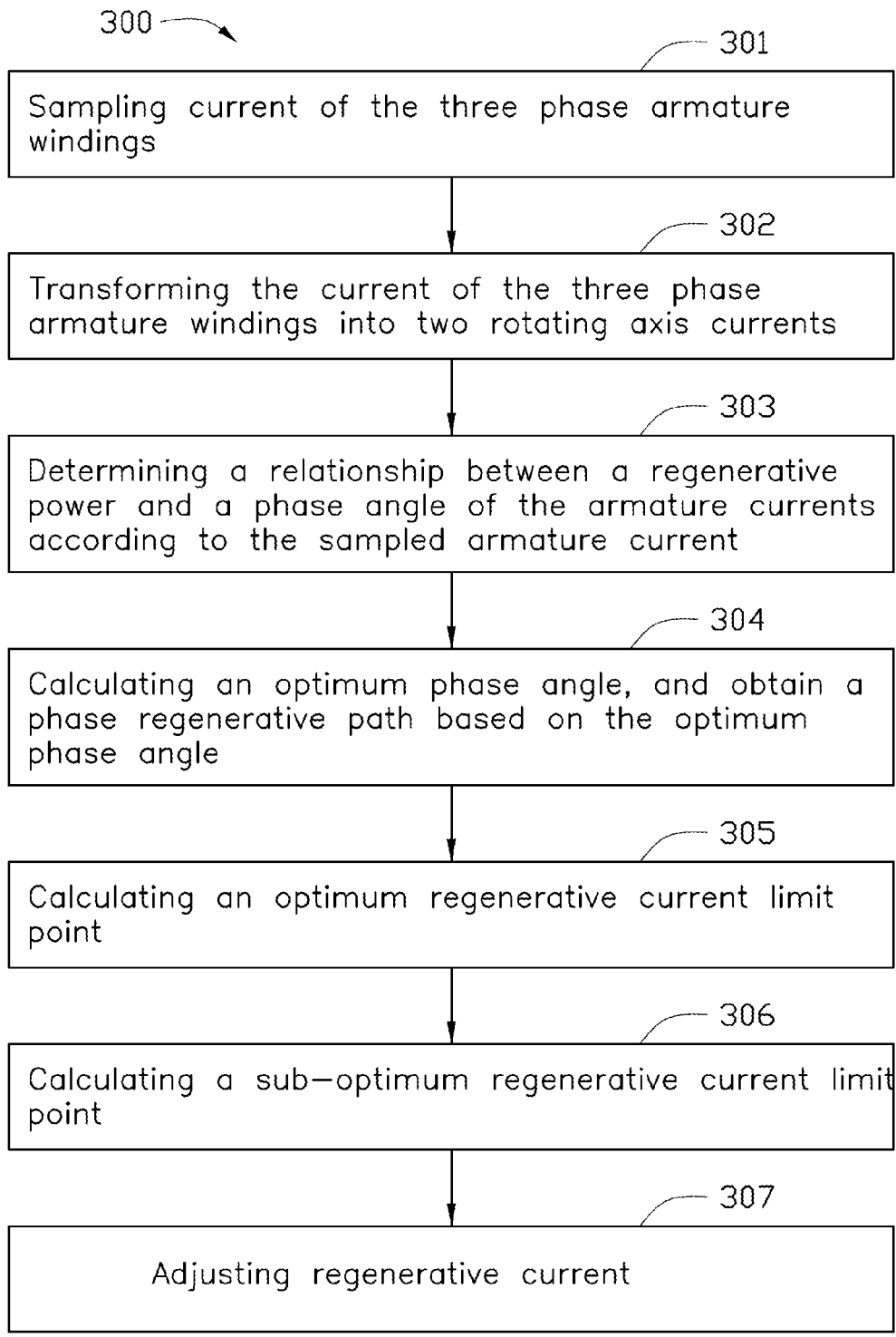
FIG. 5 is a flow chart of one embodiment of a regenerative braking controlling method using the regenerative braking controlling system of FIG. 1.

Referring to FIG. 5, a flowchart is presented in accordance with an example embodiment which is being thus illustrated. The example method 300 is provided by way of example, as there are a variety of ways to carry out the method 300. The method 300 described below can be carried out using the configurations illustrated in FIG. 1, for example, and various elements of these figures are referenced in explaining example method. Each block shown in FIG. 5 represents one or more processes, methods or subroutines, carried out in the exemplary method 300. Additionally, the illustrated order of blocks is by example only and the order of the blocks can change according to the present disclosure. The exemplary method 300 can begin at block S1.

At block 301, the armature current sampling module 110 samples current $i_a$, $i_b$, $i_c$ of the three phase armature windings 200, respectively.

At block 302, the coordinate transforming unit 131 transforms the current $i_a$, $i_b$, $i_c$ of the three phase armature windings 200 represented (i.e. characterized, or reflected) in a preset three axis and two-dimensional coordinate system A-B-C into two fixed axis current $i_\alpha$, $i_\beta$ represented in a fixed axis coordinate system α-β, according to a preset first coordinate transforming rules, and then transform the two fixed axis current $i_\alpha$, $i_\beta$ into two rotating axis current $i_d$, $i_q$ represented in a rotating axis coordinate system d-q, according to a preset second coordinate transforming rules.

At block 303, the power calculating unit 133 calculates regenerative power $P_g$ based on the rotating axis current $i_d$, $i_q$ and determines a relationship between the regenerative power $P_g$ and phase angle θ of the armature current.

At block 304, the optimum phase angle calculating unit 135 calculates an optimum phase angle under a same armature current $i_s$, and obtains a phase regenerative path based on the optimum phase angle.

At block 305, the optimum regenerative current calculating unit 137 calculates an optimum regenerative current limit point under a same armature voltage.

At block 306, the sub-optimum regenerative current calculating unit 139 calculates an sub-optimum regenerative current limit point under a same armature voltage.

At block 307, the adjusting module 150 adjusts the regenerative current of the motor according to the first limit current 34 and the second current limit 35, wherein, when the adjusting module 150 limits the regenerative current to follow along the optimum regenerative path 31, the sub-optimum regenerative path 32, and the energy consuming path 33, the electric vehicle correspondingly enters into the optimum regenerative mode, the sub-optimum regenerative mode, and the energy consuming mode.

The regenerative braking controlling system 100 realizes a maximum torque control of current per unit under the optimum phase angle $θ_1$, and calculates the d-axis $i_d$ current and the q-axis current $i_q$, and obtains the phase regenerative path 30 by adjusting the phase angle θ. In addition, the regenerative braking controlling system 100 limits the regenerative current to the phase regenerative path 30 having the optimum regenerative path 31, the sub-optimum regenerative path 32, and the energy consuming path 33 corresponding the optimum regenerative mode, the sub-optimum regenerative mode, and the energy consuming mode. Therefore, the regenerative braking controlling system 100 can effectively increase regenerative efficiency of the electric vehicle.

The embodiments shown and described above are only examples. Many details are often found in the art such as the other features. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A regenerative braking controlling system used for an electric vehicle, the electric vehicle comprising a motor having three phase armature windings, the regenerative braking controlling system comprising:
an optimum regenerative path positioned between an original point of the rotating d-q coordinate system and an optimum regenerative current limit point;
an sub-optimum regenerative path positioned between the optimum regenerative current limit point and an sub-optimum regenerative current limit point which divides a DC current end of the armature from a regenerative state to an output state;
an energy consuming path positioned between the sub-optimum regenerative current limit point and a node where a maximum armature current circle intersects wherein the DC current end of the armature starts to provide mechanical energy for braking which is converted to consumption of power;
a plurality of processing units configured to:
obtain current of the three phase armature windings;
determine a relationship between a regenerative power and a phase angle of the armature current according to the armature current;
calculate an optimum phase angle, and obtain a phase regenerative path based on the optimum phase angle wherein the phase regenerative path comprises the optimum regenerative path, the sub-optimum regenerative path, and the energy consuming path;
calculate the optimum regenerative current limit point, wherein the optimum regenerative current limit point is calculated according to equation that $$I_1 = \frac{-P\omega\lambda_m \sin\theta}{4r + P\omega(L_d - L_q)\sin2\theta},$$

wherein $$\frac{\partial P_g}{\partial i_s} = 0,$$

$$P_g = V_{dc}I_{dc} = \frac{3}{2}ri_s^2 + \frac{3}{2}\frac{P}{2}\omega\left[\lambda_m i_s \sin\theta + \frac{1}{2}(L_d - L_q)i_s^2 \sin2\theta\right]i_k$$

represents the armature current, P represents a number of poles of the armature of the motor, ω represents rotational angular velocity of the armature of the rotor, $λ_m$ represents magnetic flux of the magnet of the rotor, θ represents the phase angle of the armature current, r represents armature resistance of the motor,
$L_d$, $L_q$ represents inductances of the armature of the motor, $V_{dc}$ and $I_{dc}$ represent voltage and current of the DC current end of the armature of the motor, Pg represents the regenerative power;
calculate the sub-optimum regenerative current limit point;
adjust regenerative current to follow the optimum regenerative path, the sub-optimum regenerative path, and the energy consuming path by comparing the armature current with the optimum regenerative current limit point and the sub-optimum regenerative current limit point; and wherein
the regenerative current is decomposed into a first vector component and a second vector component along the direction of the d-axis and the q-axis respectively.

2. The regenerative braking controlling system of claim 1, wherein the plurality of processing units to transform the current of the three phase armature windings into two rotating axis currents, calculate the regenerative power based on the two rotating axis current, and determine the relationship between the regenerative power and the phase angle of the armature current according to a relationship between the rotating axis current and the phase angle of the armature current.

3. The regenerative braking controlling system of claim 2, wherein the two rotating axis currents are represented in a rotating axis coordinate system, a relationship between the armature current and the two rotating axis currents satisfies equations that $i_d = i_s \cos\theta$, $i_q = i_s \sin\theta$, wherein, $i_d$ and $i_q$ represents the rotating axis current.

4. The regenerative braking controlling system of claim 1, wherein the optimum phase angle is calculated according to equation that.

$$\cos\theta = \frac{-\lambda_m - \sqrt{\lambda_m^2 + 8(L_d - L_q)^2 i_s^2}}{4i_s(L_d - L_q)}.$$

5. The regenerative braking controlling system of claim 1, wherein the sub-optimum regenerative current limit point is calculated according to equation that $$I_2 = \frac{-2P\omega\lambda_m \sin\theta}{4r + P\omega(L_d - L_q)\sin 2\theta}.$$

wherein $P_g = 0$.

6. A regenerative braking controlling method used for an electric vehicle, the electric vehicle comprising a motor having three phase armature windings, the regenerative braking controlling method comprising:
positioning an optimum regenerative path between an original point of the rotating d-q coordinate system and an optimum regenerative current limit point;
positioning an sub-optimum regenerative path between the optimum regenerative current limit point and an sub-optimum regenerative current limit point which divides a DC current end of the armature from a regenerative state to an output state;
positioning an energy consuming path between the sub-optimum regenerative current limit point and a node where a maximum armature current circle intersects wherein the DC current end of the armature starts to provide mechanical energy for braking which is converted to consumption of power;
obtaining current of the three phase armature windings;
determining a relationship between a regenerative power and a phase angle of the armature current according to the armature current;
calculating an optimum phase angle, and obtain a phase regenerative path based on the optimum phase angle, wherein the phase regenerative path comprises the optimum regenerative path, the sub-optimum regenerative path, and the energy consuming path;
calculating the optimum regenerative current limit point, wherein the optimum regenerative current limit point is calculated according to equation that $$I_1 = \frac{-P\omega\lambda_m \sin\theta}{4r + P\omega(L_d - L_q)\sin 2\theta},$$

wherein $$\frac{\partial P_g}{\partial i_s} = 0,$$

$$P_g = V_{dc}I_{dc} = \frac{3}{2}ri_s^2 + \frac{3}{2}\frac{P}{2}\omega\left[\lambda_m i_s \sin\theta + \frac{1}{2}(L_d - L_q)i_s^2 \sin 2\theta\right]i_k$$

represents the armature current, P represents a number of poles of the armature of the motor, ω represents rotational angular velocity of the armature of the rotor, $\lambda_m$ represents magnetic flux of the magnet of the rotor, θ represents the phase angle of the armature current, r represents armature resistance of the motor,
$L_d$, $L_q$ represents inductances of the armature of the motor, $V_{dc}$ and $I_{dc}$ represent voltage and current of the DC current end of the armature of the motor, Pg represents the regenerative power;
calculating the sub-optimum regenerative current limit point;
adjusting regenerative current to follow the optimum regenerative path, the sub-optimum regenerative path, and the energy consuming path by comparing the armature current with the optimum regenerative current limit point and the sub-optimum regenerative current limit point; and
decomposing the regenerative current into a first vector component and a second vector component along the direction of the d-axis and the q-axis respectively.

7. The regenerative braking controlling method of claim 6, further comprising transforming the current of the three phase armature windings into two rotating axis currents, the regenerative braking controlling method further calculating the regenerative power based on the two rotating axis current, wherein the relationship between the regenerative power and the phase angle of the armature current is determined according to a relationship between the rotating axis currents and the phase angle of the armature current.

8. The regenerative braking controlling method of claim 7, wherein the two rotating axis currents are represented in a rotating axis coordinate system, a relationship between the armature current and the two rotating axis currents satisfies equations that $i_d = i_s \cos\theta$, $i_q = i_s \sin\theta$, wherein, $i_d$ and $i_q$ represents the rotating axis current.

9. The regenerative braking controlling system of claim 6, wherein the optimum phase angle is calculated according to equation that $$\cos\theta = \frac{-\lambda_m - \sqrt{\lambda_m^2 + 8(L_d - L_q)^2 i_s^2}}{4i_s(L_d - L_q)}.$$

10. The regenerative braking controlling system of claim 6, wherein the sub-optimum regenerative current limit point is calculated according to equation that $$I_2 = \frac{-2P\omega\lambda_m \sin\theta}{4r + P\omega(L_d - L_q)\sin 2\theta},$$

wherein $P_g = 0$.

* * * * *